US009658049B2

(12) United States Patent
Arnstein et al.

(10) Patent No.: US 9,658,049 B2
(45) Date of Patent: May 23, 2017

(54) SENSOR HEAD FOR AN ENCODER (71) Applicant: LEINE & LINDE AB, Straengnaes (SE)

(72) Inventors: Richard Arnstein, Straengnaes (SE); Magnus Larsson, Eskilstuna (SE)

(73) Assignee: LEINE & LINDE AB, Straengnae S (SE)

( * ) Notice: Subject to any disclaimer, the term of this patent is extended or adjusted under 35 U.S.C. 154(b) by 671 days.

(21) Appl. No.: 13/887,902

(22) Filed: May 6, 2013

(65) Prior Publication Data

US 2013/0293222 A1  Nov. 7, 2013

(30) Foreign Application Priority Data

May 4, 2012 (SE) ...................... 1250455

(51) Int. Cl.
G01R 33/00 (2006.01)
G01B 7/14 (2006.01)
G01D 5/347 (2006.01)

(52) U.S. Cl.
CPC .......... *G01B 7/14* (2013.01); *G01D 5/34715* (2013.01)

(58) Field of Classification Search
CPC .. G01D 5/3473; G01D 5/145; G01D 5/34738; G01D 11/245; G01D 5/34707; G01D 5/34715; G01B 5/14
USPC .................................................. 324/207.25
See application file for complete search history.

(56) References Cited

U.S. PATENT DOCUMENTS

| 3,894,232 | A | * | 7/1975 | Laspesa | G01D 5/34715 250/231.13 |
| 4,644,158 | A | | 2/1987 | Taillebois | |
| 4,746,859 | A | | 5/1988 | Malik | |
| 5,883,384 | A | * | 3/1999 | Kato | G01D 5/34738 250/231.13 |
| 8,970,205 | B2 | * | 3/2015 | Janecek | G01R 33/07 324/117 H |
| 2008/0030188 | A1 | | 2/2008 | Ponziani et al. | |
| 2013/0099107 | A1 | * | 4/2013 | Omoto | F16C 41/007 250/231.13 |

FOREIGN PATENT DOCUMENTS

| DE | 103 54 458 | 6/2005 |
| DE | 10 2005 056 207 | 6/2007 |
| DE | 10 2007 059 362 | 6/2008 |
| DE | 10 2007 022 765 | 11/2008 |
| EP | 0 123 618 | 10/1984 |

(Continued)

OTHER PUBLICATIONS

Potting, available Dec. 30, 2010 at https://web.archive.org/web/20101230073011/http://en.wikipedia.org/wiki/Potting_(electronics).*

(Continued)

*Primary Examiner* — Daniel Miller
(74) *Attorney, Agent, or Firm* — Andrews Kurth Kenyon LLP (57) ABSTRACT A sensor head for an encoder assembly includes a housing and at least two detectors. The sensor head is intended for scanning directly toward a rotatable encoding member positioned on a carrier ring. The carrier ring is intended to be installed on a shaft of a machine. The detectors are arranged on detector strips are displaceably attached to the housing.

16 Claims, 6 Drawing Sheets (56) References Cited

FOREIGN PATENT DOCUMENTS

| WO | 2011/018330 |   | 2/2011 |
|----|-------------|---|--------|
| WO | WO 2012/002318 | * | 1/2012 |

OTHER PUBLICATIONS

Baumer, Magnetic sensing system without bearings for large shaft diameters, 2009, available at http://www.baumer.com/us-en/latest-news/newsroom/news/details/artikel/the-next-magnetic-encoder-generation-magnetic-sensing-system-without-bearings-for-large-shaft-di/.*
European Search Report, dated Jul. 11, 2013, issued in corresponding European Patent Application No. 13166488.0.

* cited by examiner

SENSOR HEAD FOR AN ENCODER

CROSS-REFERENCE TO RELATED APPLICATIONS

The present application claims priority to Application No. 1250455-1, filed in the Kingdom of Sweden on May 4, 2012, which is expressly incorporated herein in its entirety by reference thereto.

FIELD OF THE INVENTION

The present invention relates to a sensor head for an encoder.

BACKGROUND INFORMATION

Encoders are often used in environments where they are subjected to significant vibrations, and often in a heavily contaminated environment. The encoder may, for instance, be used to generate the position values of shaft rotation in a machine. For instance, the encoder may be attached to a rotating shaft in the machine. The encoding disk is caused to rotate as the shaft rotates, and the encoder casing and detector are firmly affixed to the casing of the machine.

In certain conventional systems, an optoelectrical state encoder is used, which includes an encoding disk that has an optically readable pattern. The disk pattern is read by one or more sensor heads having at least one detector, which each deliver an electric signal in relation to the amount of light that is received in the detector, so that movement of the encoding disk in relation to the detector will be indicated by changes in the electric signal.

The encoding disk includes a periodic pattern, such as a plurality of reflective and non-reflective fields of the same size, for instance. When the encoding disk is turned or rotated, the change between reflective and non-reflective fields can be detected and a change in angle thus determined.

Besides the use of optical/reflective encoders, there are also encoders for magnetic, magnetoresistive and inductive scanning.

However, when the shafts have very large diameters, such conventional encoders meet their limitation due to the need for specialized mounting, such as toothed belt arrangements, that are complicated and expensive. Furthermore, conventional encoders cannot be used for shaft ends that are inaccessible or for hollow shafts. Recently, magnetic encoders have been introduced in the market, including a magnetic tape that can be installed on large shafts more easily and inexpensively compared to the conventional encoders. When a magnetic tape is used, a carrier ring is suitably installed on the shaft, which carrier ring supports the magnetic tape. A sensor head for reading the magnetic tape is arranged with a small air gap close to the magnetic tape on the carrier ring that is arranged on the shaft. In similar manner, when a sensor head is used for magnetoresistive, optical/reflective and inductive scanning, the gap between the sensor head and the shaft is arranged with a small air gap.

A problem with the use of magnetic, magnetoresistive, optical/reflective and inductive encoders is that the side of the sensor head housing facing the shaft or the carrier ring has to match the curvature of the shaft, as well as any carrier ring on the shaft. This is due to the fact that the detector(s) inside the housing of the sensor head should be arranged as close as possible and with the same distance to the periphery of the shaft, since the reading capability of the detectors decreases with increasing distance. Hence, the side of the sensor head facing the shaft or carrier ring should have the same curvature as the shaft or carrier ring when dual detectors are used. At least two detectors are necessary when using, for example, magnetic tape encoders in order to be able to sense the tape without interruptions over the joint on the tape. For practical reasons, a conventional sensor head is provided with dual detectors within its housing. Consequently, for any given shaft diameter, a respective housing of a sensor head is conventionally manufactured with a front wall, facing the shaft/ring, having a given curvature for the specific shaft dimension. Further, in such a conventionally manufactured sensor head, the detectors are fixed in an exact arrangement and other components are also arranged within the housing of the sensor head for the specific shaft dimension. To sum up, all the above mentioned requirements for the sensor head result in a sensor head that is expensive and complicated.

PCT International Published Patent Application WO 2011/018330 describes a pole wheel arrangement for a rotary encoder, in which the pole wheel includes pole wheel segments. The encoder has a sensor head with several sensors.

SUMMARY

Example embodiments of the present invention provide a sensor head that may eliminate the disadvantages associated with conventional systems, such as those described above. Furthermore, example embodiments of the present invention provide a sensor head that is less expensive and less complicated to produce, as compared to conventional systems. Moreover, example embodiments of the present invention provide a sensor head for an encoder that can be used for a variety of shaft dimensions.

According to example embodiments of the present invention, a sensor head for an encoder includes a housing and at least two detectors. The detectors are adjustably arranged to the housing.

Thus, a cost efficient and an uncomplicated sensor head, from a production point of view, may be achieved. As a result, the time for delivery can be shortened compared to the manufacturing of conventional sensor heads.

The reliability of the sensor head and its components may also be increases since the same components can be used when producing various sizes of sensor heads.

In addition, the sensor head can be used for different shaft diameters and need not to be adapted for any specific shaft dimension. Thus, it may be easier to set the detectors of the sensor head at equal distance to the carrier ring or shaft.

Further features and aspects of example embodiments of the present invention are described in more detail below with reference to the appended Figures.

DETAILED DESCRIPTION

Figure 1A:
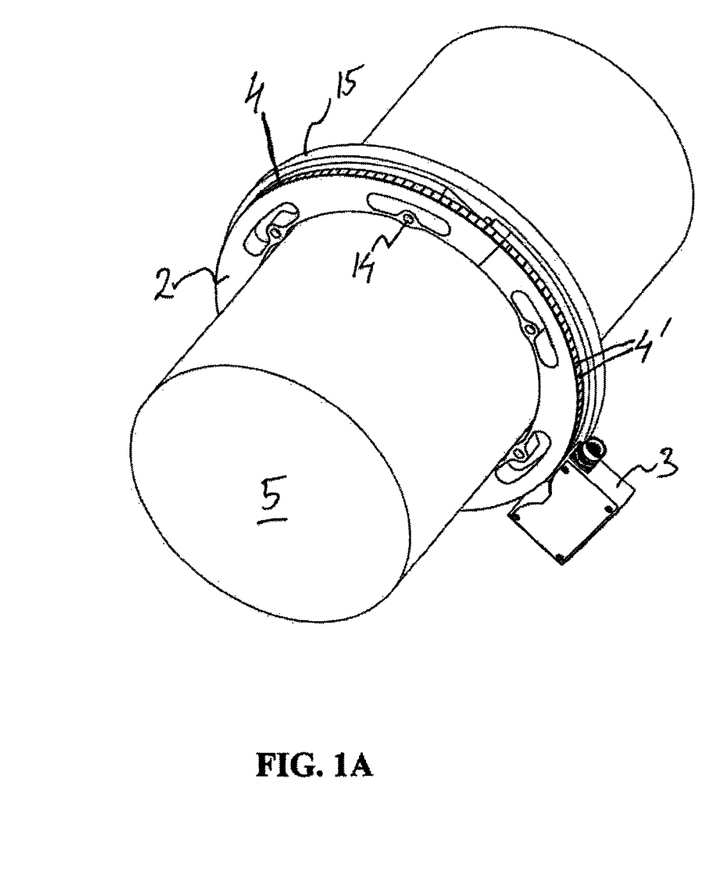
FIG. 1A is a schematic perspective view of an encoder assembly according to an example embodiment of the present invention.
Figure 1B:
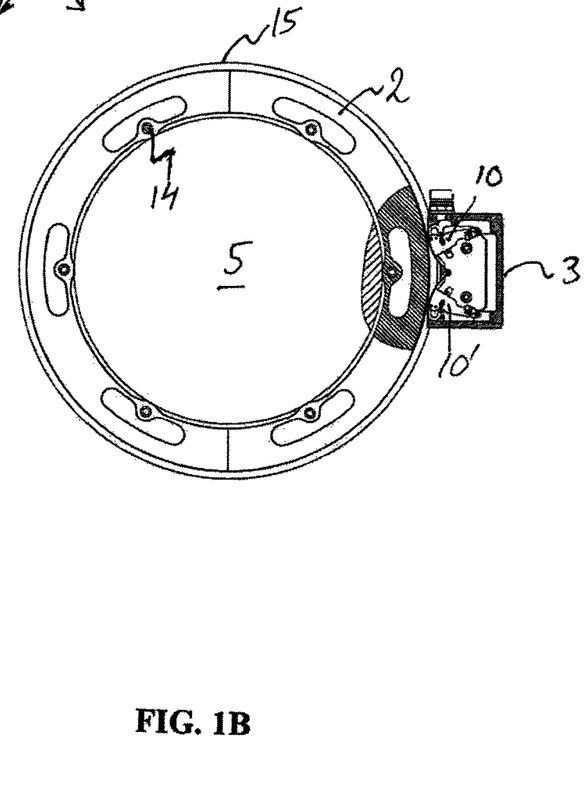
FIG. 1B is a schematic side view of the encoder assembly illustrated in FIG. 1A, where a portion of the carrier ring and the sensor head is illustrated in cross section.
Figure 2:
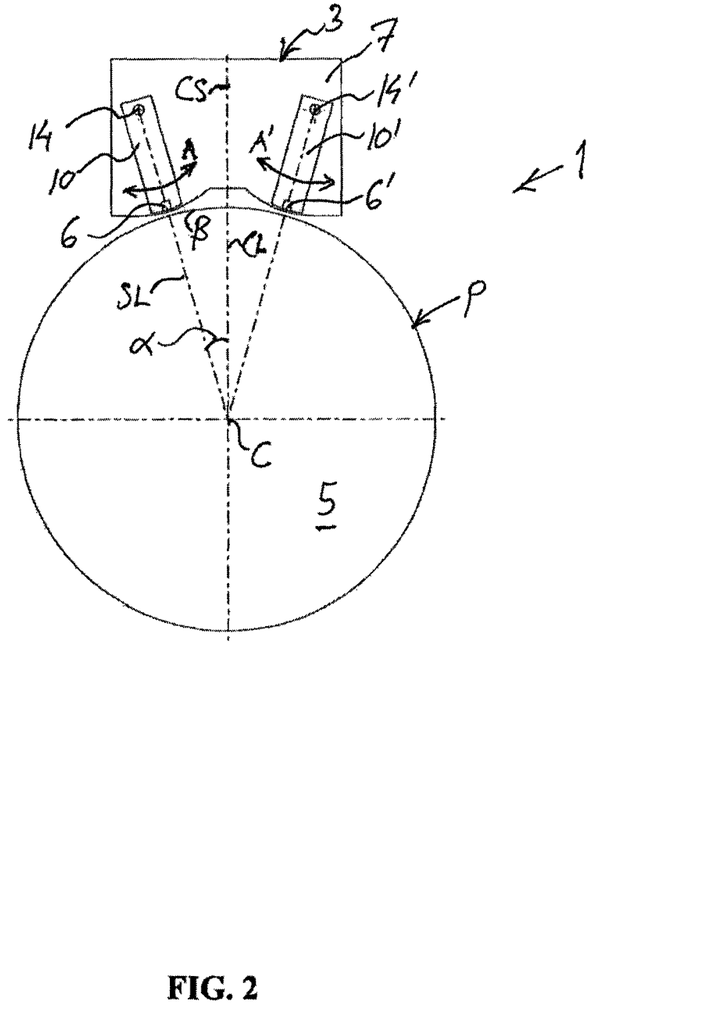
FIG. 2 is a schematic front view of a sensor head for an encoder according to an example embodiment of the present invention.

FIGS. 1A, 1B, and 2 schematically illustrate an encoder assembly 1 according to an example embodiment of the present invention. The encoder 1 is suitable for magnetic, magnetoresistive, optical/reflective, or inductive scanning and includes a sensor head 3, for scanning a rotatable encoding member 4, such as directed towards a shaft 5 (see FIG. 2) of a machine having an encoding member or towards a carrier ring 4 (see FIGS. 1A and 1B), with the encoding member, mounted on the shaft 5. Hence, the encoding member is caused to rotate as the shaft rotates, and the sensor head 1 is firmly affixed to a casing of the machine. For instance, in a magnetic encoder, the encoding member 4 includes magnetic element(s), such as a magnetic tape with magnetic poles 4', carried directly on the shaft 5 or on a carrier ring 4. The magnetic element(s) may also include, e.g., one or more magnets that are attached in plastics and molded onto a ring where it is magnetized. At least two detectors in the sensor head 3 are necessary when using magnetic tape encoders in order to be able to sense the tape without interruptions over the joint on the magnetic tape with magnetic poles 4'. For all magnetoresistive, optical/reflective, and inductive encoders having the similar configuration with rings and sensor heads, the same basic arrangement is applicable.

Further, as illustrated in FIG. 2, the encoder 1 includes a housing 7 and at least two detectors 6, 6'. The housing 7 illustrated in FIG. 2 is, e.g., a substantially hollow body that has an inner compartment as described further below.

In FIG. 2, a shaft 5 is schematically illustrated, having an encoding member attached on its periphery P. The shaft has a rotational center C. Further, each detector 6, 6' is arranged on a detector strip 10, 10' including a circuit board. On the detector strip 10, 10', each detector 6, 6' is arranged in one first end 12 (see FIGS. 4A to 4C). The detectors 6, 6' at the first one end 12 of the detector strip 10, 10' should be arranged as close as possible and with the same distance to the periphery P of the shaft 5, since the reading capability of the detectors 6, 6' decreases with increasing distance. Consequently, in order to optimize the reading capability of the detectors, the detector strip 10, 10' is provided with a pivot 14, 14' at a second opposite end 16 (see FIGS. 4A to 4C), compared to the mentioned first end 12. Hence, the position of the detectors 6, 6' arranged to the housing 7, are displaceably arranged as shown schematically by arrows A, A' in FIG. 2 by rotating the detector strip 10, 10' about the pivot 14, 14'. As a result, the position of the detectors 6, 6' in relation to the shaft may readily be adjusted in order to be used for encoder installations with different shaft diameters D having different circumferential curvature β. For a correct encoder installation of the sensor head 3 to a specific shaft diameter, each detector strip 10, 10' is adjusted such that the pivot 14, 14', the detector 6, 6', and a center C of the shaft 5, are arranged along a straight line SL defining an angle α between the straight line SL and a center line CL that extends through the center CS of the sensor head and the shaft center of rotation C, for the intended installed position of the sensor head 3 for scanning towards a shaft 5.

Figure 3A:
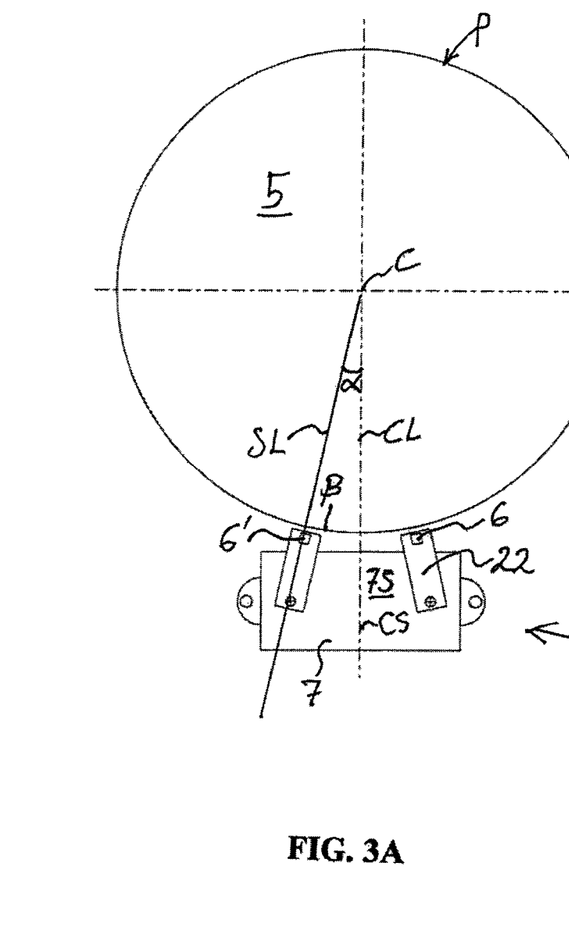
FIG. 3A is a schematic front view a sensor head for an encoder according to an example embodiment of the present invention.
Figure 3B:
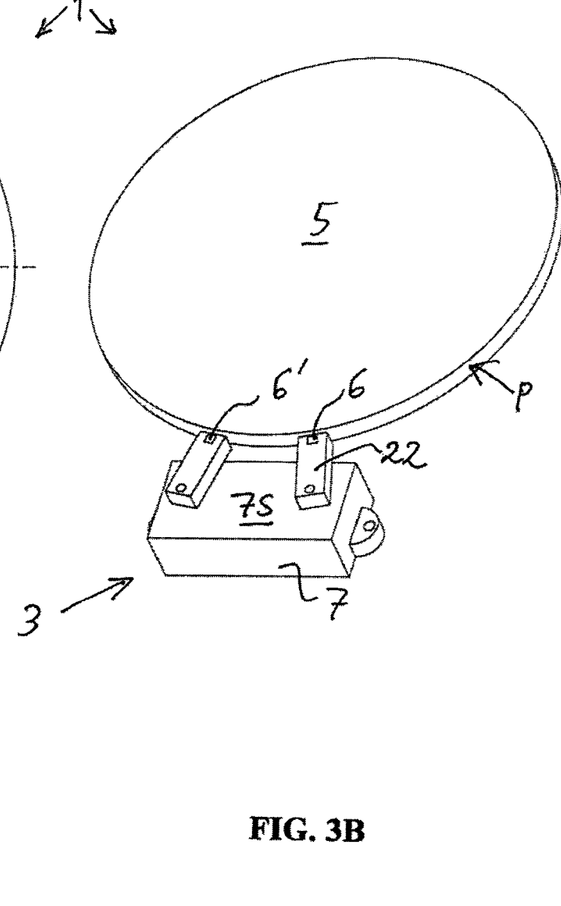
FIG. 3B is a schematic perspective view of the sensor head illustrated in FIG. 3A.

FIGS. 3A and 3B schematically illustrate a sensor head 3 for an encoder assembly 1 according to an example embodiment of the present invention. The shaft 5 is illustrated as a thin disk in FIG. 3B. In FIG. 3B, the same reference numbers as used in FIGS. 1A, 1B, and 2 are used for similar features. One difference compared to the example embodiment described above and illustrated in FIGS. 1A, 1B, and 2 is that the detectors 6, 6' are displaceably arranged on the outside 7S of the housing 7 as shown in FIGS. 3A and 3B. Another difference is that the housing 7, besides including a hollow body, may be a partly or totally solid body such as a plate, etc. Moreover, each detector strip 10, 10' with a respective detector 6, 6', arranged on the outside 7S of the housing, is encapsulated in a casing 22. Cables, contacts, etc., may be arranged on the outside or inside the housing 7.

Figure 4A:
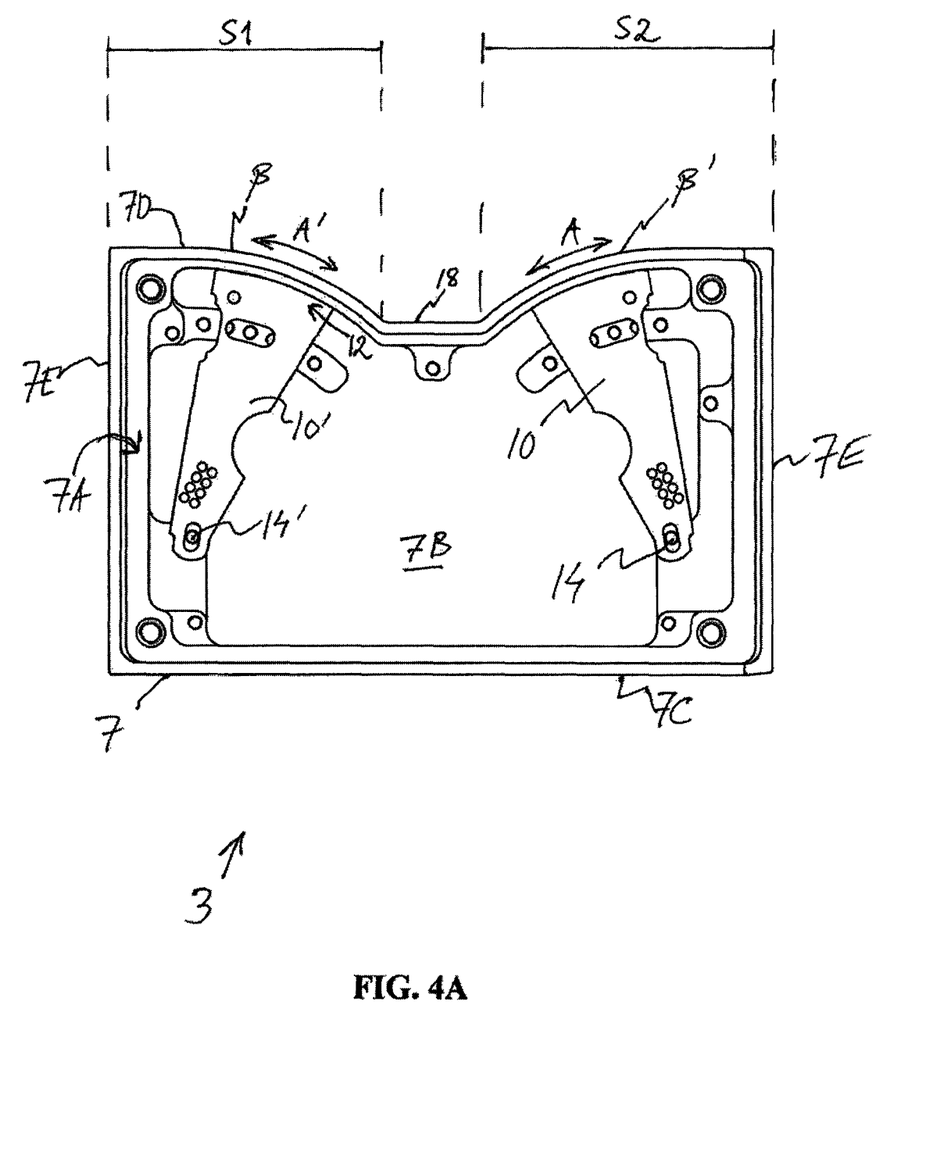
FIG. 4A is a schematic top view of a sensor head according to an example embodiment of the present invention, with the top of the housing removed.
Figure 4B:
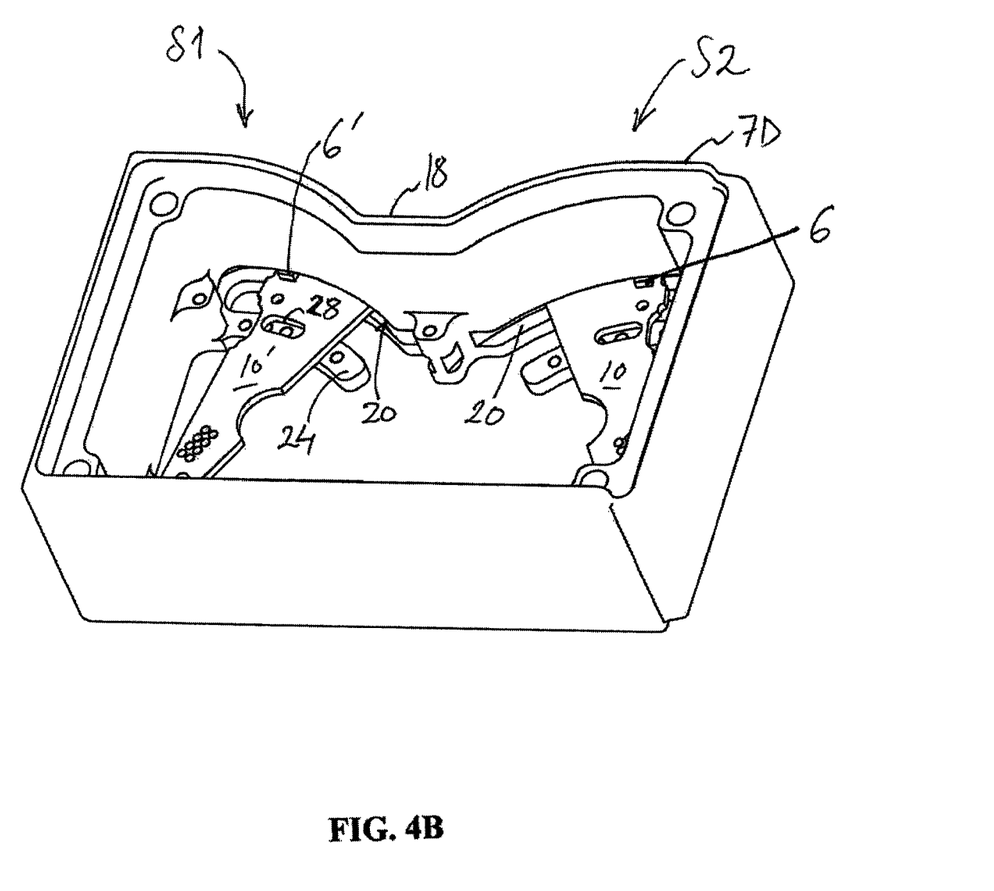
FIG. 4B is a schematic perspective view, obliquely from above, of the sensor head illustrated in FIG. 4A.
Figure 4C:
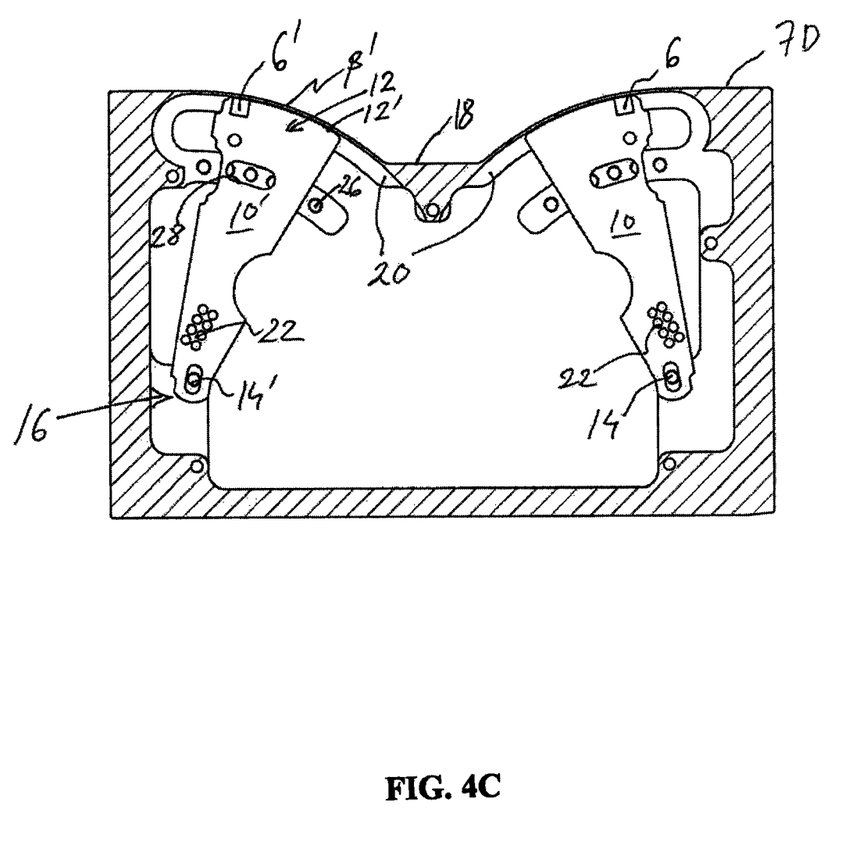
FIG. 4C is a schematic cross-sectional top view of the sensor head illustrated in FIGS. 4A and 4B.

In the example embodiment illustrated in FIGS. 1A, 1B, and 2, as well as in the example embodiment illustrated in FIGS. 4A to 4C described below, the housing 4 has a compartment that is defined by a top 7A, a bottom 7B and four walls, a rear wall 7C, a front wall 7D and two respective side walls 7E (see FIGS. 1A, 1B, and 2). According to the example embodiment described and illustrated with reference to FIGS. 4A to 4C, the same reference numbers as in the example embodiment of FIGS. 1 and 2 are used for the similar features. Hence, according to the example embodiments illustrated in FIGS. 1A, 1B, and 2, the detectors 6, 6', on each detector strip 10, 10', are displaceably arranged A, A' within the housing 7. Consequently, when the detectors 6, 6' are displaceably arranged within the housing, partial sections S1, S2 of the front wall 7D of the sensor head housing 7 facing the shaft 5 (see FIG. 2) have a curvature of, e.g., β' that follows the displacement motion A, A' of each detector on the respective detector strip 10, 10', when displaced by rotation in respective pivot 14, 14', to match the specific curvature β of the shaft 5 or a carrier ring, carrying a encoding member. The short side edge 12' of the first end 12 of each detector strip 10, 10' has a corresponding curvature β' as the partial sections S1, S2. The curvature has a concave circular arc shape, as seen in the direction towards the shaft. As a result, partial sections S1, S2 of the front wall 7D of the sensor head 3 facing a shaft 5, adjacent each short side 12' of each detector strip 10, 10', has a concave circular arc shape, as seen in the direction towards the shaft. In other words, the curvature β' of the partial sections S1, S2 describe a tangent of each curvature β for a specific dimension of the shaft 5 or a carrier ring 4 on the shaft 5.

The length of a bridging section 18 between the partial sections S1, S2 of the front wall 7D depends on the diameter of the shaft and, e.g., the magnetic poles of a tape for a magnetic encoder. Typically, the length of the bridging section is in the range of, e.g., about 30 to 40 mm.

A front wall 7D of the sensor head 3 facing a shaft 5 may be provided with a slot 20 on the inside of the housing 7, in which slot 20 the outer end 12 of the detector strip 10, 10', where a respective detector 6, 6' is arranged, is inserted. Thus, the front wall 7D is partially thinner at the slot 20, such that the respective detector 6, 6' at the edge of each detector strip 10, 10' can be positioned even closer to the periphery P of the shaft 5, to further improve the reading capability of the detectors 6, 6'.

The whole detector strip 10, 10', or a part of the detector strip 10, 10', can be a circuit board. In, for example, the second end 16 there can be an electric contact 22 for attachment of cable(s), a flex strip, etc., for further connection to a main circuit board positioned below a lid forming the top 7A.

The housing 7 is further provided with a variable attachment device for fixing the detector strips 10, 10' in desired position. For example, on the bottom 7B of the housing, a guiding rail 24 with a number of suitable threaded holes 26 can be arranged. Suitably, the guiding rail 24 has a corresponding curvature β' as the front edge 12' of the detector plates 10, 10' and the partial sections. Each detector strip 10, 10' is provided with a through hole 28 for fastening of a screw through the through hole 28 and into one of the threaded holes in the rail. Hence, a detector strip 10, 10' is adjusted and positioned along the guiding rail into a desired position for scanning towards a shaft 5, or a carrier ring on the shaft, and fastened by a fastening device.

In the example embodiments illustrated, there are two detector strips 10, 10' having a respective detector 6, 6'. It should be understood that the number of detector strips and detectors can be more than two.

What is claimed is:

1. A sensor head for an encoder, comprising:
   a housing; and
   at least two detectors displaceably attached to the housing;
   wherein a position of each detector is displaceable in accordance with a dimension of a shaft to which the sensor head is installable;
   wherein each detector is arranged on a respective detector strip having a circuit board; and
   wherein each detector is arranged in one end of the detector strip, and a pivot of the detector strip is arranged at an opposite end of the detector strip.

2. The sensor head according to claim 1, wherein the pivot, the detector, and a center of the shaft, when the sensor head is installed to the shaft, are arranged along a straight line when the sensor head is in a correct installation position.

3. The sensor head according to claim 1, wherein the detectors are displaceably arranged within the housing.

4. The sensor head according to claim 1, wherein a front wall of the sensor head facing the shaft has a concave circular arc shape, as seen in a direction toward the shaft.

5. The sensor head according to claim 1, wherein the detectors are displaceably arranged on an outside of the housing.

6. The sensor head according to claim 5, wherein each detector strip and respective detector is encapsulated in an encasement.

7. The sensor head according to claim 6, wherein the pivot, the detector, and a center of the shaft, when the sensor head is installed to the shaft, are arranged along a straight line when the sensor head is in a correct installation position.

8. The sensor head according to claim 1, wherein the position of each detector is independently displaceable in accordance with the dimension of the shaft.

9. A sensor head for an encoder, comprising:
   a housing; and
   at least two detectors displaceable attached to the housing;
   wherein a position of each detector is displaceable in accordance with a dimension of a shaft to which the sensor head is installable;
   wherein each detector is arranged on a respective detector strip having a circuit board;
   wherein the detectors are displaceably arranged within the housing; and
   wherein a front wall of the sensor head facing the shaft includes a slot on an inside of the housing, each detector is arranged at an outer end of the respective detector strip, the outer end of each detector strip arranged in the slot.

10. A sensor head for an encoder, comprising:
    a housing; and
    at least two detectors displaceably attached to the housing;
    wherein a position of each detector is displaceable in accordance with a dimension of a shaft to which the sensor head is installable;
    wherein each detector is arranged on a respective detector strip having a circuit board;
    wherein a front wall of the sensor head facing the shaft has a concave circular arc shape, as seen in a direction toward the shaft; and
    wherein the front wall of the sensor head facing the shaft includes a slot on an inside of the housing, and each detector is arranged at an outer end of the detector strip, the outer end of each detector strip being arranged in the slot.

11. An encoder system, comprising:
    a shaft; and
    a sensor head, including a housing and at least two detectors displaceably attached to the housing;
    wherein a position of each detector is displaceable in accordance with a dimension of the shaft;
    wherein each detector is arranged on a respective detector strip having a circuit board; and
    wherein each detector is arranged in one end of a detector strip, and a pivot of the detector strip is arranged at an opposite end of a detector strip.

12. The encoder system according to claim 11, wherein the pivot, the detector, and a center of the shaft, when the sensor head is installed to the shaft, are arranged along a straight line when the sensor head is in a correct installation position.

13. The encoder system according to claim 11, wherein the detectors are displaceably arranged within the housing.

14. The encoder system according to claim 11, wherein a front wall of the sensor head facing the shaft has a concave circular arc shape, as seen in a direction toward the shaft.

15. The encoder system according to claim 11, wherein the position of each detector is independently displaceable in accordance with the dimension of the shaft.

16. An encoder system, comprising:
    a shaft; and
    a sensor head, including a housing and at least two detectors displaceably attached to the housing;
    wherein a position of each detector is displaceable in accordance with a dimension of the shaft;
    wherein each detector is arranged on a respective detector strip having a circuit board;
    wherein the detectors are displaceably arranged within the housing; and
    wherein a front wall of the sensor head facing the shaft includes a slot on an inside of the housing, each detector is arranged at an outer end of the respective detector strip, the outer end of each detector strip arranged in the slot.

* * * * *